Patented Mar. 29, 1938

2,112,799

UNITED STATES PATENT OFFICE 2,112,799

TREATING FILTER FIBERS

Robert C. Williams, Columbus, Ohio, assignor to The Ironsides Company, Columbus, Ohio, a corporation of Ohio No Drawing. Application July 7, 1936,
Serial No. 89,482

2 Claims. (Cl. 183—45)

This invention relates to an improved composition, composed primarily of petroleum hydrocarbons and deliquescent salts, especially adapted for the purpose of treating hemp and other cellulosic or vegetable fibers in order to render the latter, when in the form of a loose assemblage, more efficient when employed in air filtration capacities.

Hemp fibers are being used to a limited extent as air filters in conditioning apparatus for removing dust or solid particles from air or other gaseous fluids and also for thermal insulation purposes. The same, however, are of vegetable origin and do not possess the inflammable properties of rock, glass or other siliceous wools. I have found that such hemp fibers, however, when sprayed with a substantial percentage of a combination of petroleum hydrocarbons, calcium chloride, bentonite and water present coated surfaces of the above combination of materials in a form which effectively retains dust, or other solid particulate impurities occurring in the air and which contact with such surfaces. Furthermore, dust which adheres to these coated fibers acts as a wick, becoming permeated with the composition and thereby enabling the latter to retain additional dust.

An important advantage of this novel treating composition is that the ratio of petroleum oil to deliquescent salt can be established, so that under various atmospheric conditions, sufficient fireproofing effect can be obtained whereby the hemp fibers, which of themselves burn readily, when coated with said composition do not support combustion on being subjected momentarily, or for a short period, to a flame.

An example of my preferred formula in percentages by weight is as follows:

| | Per cent |
|---|---|
| Bentonite | 4.0 |
| Water | 36.5 |
| Calcium chloride | 36.5 |
| Technical white oil vis. 100 sec. Saybolt at 100° F. | 23.0 |

This formula produces a substantially odorless product. Spray equipment, which is fed under a slight pressure, is preferably employed to handle the product without dilution with water, as the texture thereof is short. Dilution with water, prior to spraying, if it is desirable, can be accomplished by merely stirring the water into the emulsion.

In the case of an air filter composed of a loose assemblage of hemp fibers coated with a composition of the above formula, adapted for use in air conditioning equipment in which the air passing through the filter is not refrigerated and consistently has a high relative humidity, it is possible that a lower percentage of deliquescent salt would be preferable. In other words, a lower ratio of the calcium chloride to the petroleum hydrocarbon under such conditions would check excessive moisture absorption, which may be undesirable because of possible excess drippage. The formula given above, however, contains sufficient calcium chloride to serve quite effectively under conditions of relatively low humidity, and also affords a substantial measure of fire resistance under such conditions.

The low cost of such treating material is very advantageous and when the filter becomes charged with dust so that the resistance to the passage of air is too great, the entire filter is discarded without involving any considerable economic loss.

The bentonite serves to satisfactorily emulsify the oil in the water and being inexpensive is quite desirable in this connection. Other emulsifying agents not adversely affected by the high concentration of deliquescent salt will also serve satisfactorily. It is believed preferable to mix the ingredients in the following order, namely, water, bentonite, deliquescent salt and oil.

Examples of other formulas which may be successfully employed are as follows:

| | Per cent |
|---|---|
| Water | 37.5 |
| Bentonite | 1.9 |
| Calcium chloride | 37.5 |
| Light paraffin oil (vis. 100 sec. Saybolt at 100° F.) | 22.0 |
| Neutral degras | 1.1 |
| | 100.0 |

| | Per cent |
|---|---|
| Water | 37.5 |
| Bentonite | 1.9 |
| Calcium chloride | 37.5 |
| Technical white oil (vis. 100 sec. Saybolt at 100° F.) | 23.1 |
| | 100.0 |

In the latter formula, a paraffin oil having a viscosity of approximately 80 sec. Saybolt at 100° F. has also been found satisfactory. However, the formulas having the technical white oil have been more satisfactory from the standpoint of the elimination of odor.

No fire hazards of any kind exist during the application of the emulsion to the hemp fibers and appreciable protection is extended the fibers when coated with the compositions above set forth.

What is claimed is:

1. As a new article of manufacture, an air filter comprising vegetable fibers coated with a film deposited from an emulsion of hydrocarbon oil-in-water containing a deliquescent salt and bentonite, the film so deposited being in an amount to collect solid particulate impurities occurring in air passed through the fibers and to preclude combustion when momentarily subjected to a flame.

2. The article as set forth in claim 1 in which the fibers are hemp, the deliquescent salt is calcium chloride, and the oil is technical white oil having a viscosity of 100 seconds Saybolt at 100° F.

ROBERT C. WILLIAMS.